(12) United States Patent
Ko et al.

(10) Patent No.: US 9,924,383 B2
(45) Date of Patent: Mar. 20, 2018

(54) METHOD AND TERMINAL FOR TRANSMITTING AND RECEIVING DATA ACCORDING TO A TRANSMISSION SPEED OF DATA

(71) Applicant: SAMSUNG ELECTRONICS CO., LTD., Suwon-si (KR)

(72) Inventors: Hyeon-mok Ko, Hwaseong-si (KR); Kill-yeon Kim, Suwon-si (KR); Mun-hwan Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 196 days.

(21) Appl. No.: 14/821,077

(22) Filed: Aug. 7, 2015

(65) Prior Publication Data

US 2016/0044670 A1 Feb. 11, 2016

Related U.S. Application Data

(60) Provisional application No. 62/034,362, filed on Aug. 7, 2014.

(30) Foreign Application Priority Data

May 6, 2015 (KR) .................. 10-2015-0063224

(51) Int. Cl.
*H04W 24/02* (2009.01)
*H04L 1/00* (2006.01)

(52) U.S. Cl.
CPC ........... *H04W 24/02* (2013.01); *H04L 1/0009* (2013.01)

(58) Field of Classification Search
None
See application file for complete search history.

(56) References Cited

U.S. PATENT DOCUMENTS

| | | | |
|---|---|---|---|
| 6,996,104 B2 | 2/2006 | Trossen et al. | |
| 7,054,643 B2 | 5/2006 | Trossen et al. | |
| 2002/0194361 A1* | 12/2002 | Itoh .................. | H04L 1/0002 709/233 |
| 2003/0231655 A1* | 12/2003 | Kelton .............. | H04N 7/17318 370/468 |
| 2004/0076118 A1 | 4/2004 | Ho et al. | |
| 2008/0062948 A1* | 3/2008 | Ponnuswamy ...... | H04W 28/18 370/342 |
| 2008/0222490 A1* | 9/2008 | Leung ................ | G06F 11/1068 714/763 |
| 2010/0125764 A1* | 5/2010 | Kose ................. | H03M 13/1171 714/704 |
| 2011/0103491 A1* | 5/2011 | Saes .................. | G01R 33/3621 375/241 |
| 2014/0133303 A1 | 5/2014 | Jia et al. | |

* cited by examiner

*Primary Examiner* — Ayaz Sheikh
*Assistant Examiner* — Tarell Hampton
(74) *Attorney, Agent, or Firm* — Sughrue Mion, PLLC

(57) ABSTRACT

A method of and an apparatus for transmitting first data to a plurality of receiver terminals connected to a transmitter terminal through the transmitter terminal and transmitting second data to the plurality of receiver terminals through the transmitter terminal is performed according to a transmission speed determined based on at least one selected from feedback information of a receiver terminal selected based on a data loss rate of the first data and variation information of data stored in a buffer of the transmitter terminal.

21 Claims, 11 Drawing Sheets

METHOD AND TERMINAL FOR TRANSMITTING AND RECEIVING DATA ACCORDING TO A TRANSMISSION SPEED OF DATA

CROSS-REFERENCE TO RELATED APPLICATIONS

This application claims priority from U.S. Provisional Application No. 62/034,362, filed on Aug. 7, 2014, in the United States Patent and Trademark Office and Korean Patent Application No. 10-2015-0063224, filed on May 6, 2015, in the Korean Intellectual Property Office, the disclosures of which are incorporated herein in their entireties by reference.

BACKGROUND

1. Field

The present disclosure relates to a method of transmitting and receiving data through a transmitter terminal, a method of transmitting and receiving data through a receiver terminal, a transmitter terminal for transmitting and receiving data, a receiver terminal for transmitting and receiving data, and a recording medium having recorded thereon a program for performing a method of transmitting and receiving data.

2. Description of the Related Art

The Internet has evolved from a human-centered connection network through which users generate and consume information into an Internet of Things (IoT) network by exchanging information between diffused elements such as physical objects or things. An Internet of Everything (IoE) technology has emerged, where processing large data through a connection to a cloud server is combined with an IoT technology. Technological elements, such as a sensing technology, a wired or wireless communication and network infrastructure, a service interface technology, and a security technology, are required to support the IoT. Therefore, technologies, such as a sensor network, a machine to machine (M2M), or a machine type communication (MTC) for connecting between objects or things, have been studied.

An Internet Technology (IT) service may be provided in an IoT environment to collect and analyze data generated from being connected to things to create a new value in society. The IoT may be fused and incorporated with an existing information technology (IT) connected between various industries to be applied in fields such as smart homes, smart buildings, smart cities, smart cars or connected cars, smart grids, healthcare, smart home appliances, advanced medical services, etc.

SUMMARY

Provided are methods and apparatuses for controlling a transmission speed of data when transmitting and receiving the data between a plurality of terminals in order to efficiently use resources for transmitting and receiving the data.

Additional aspects will be set forth in part in the description which follows and, in part, will be apparent from the description, or may be learned by practice of the presented exemplary embodiments.

According to an aspect of an exemplary embodiment, a method of transmitting and receiving data through a transmitter terminal, includes transmitting first data to a plurality of receiver terminals connected to a transmitter terminal, determining a transmission speed of second data based on at least one selected from feedback information of a first receiver terminal selected from the plurality of receiver terminals based on a data loss rate of the first data and variation information of data stored in a buffer of the transmitter terminal, and transmitting the second data to the plurality of receiver terminals according to the determined transmission speed.

The determining of the transmission speed may include determining a transmission speed of the first data based on an amount of data transmitted to at least one of the plurality of receiver terminals for a preset time; and determining the transmission speed of the second data based on the transmission speed of the first data and an amount of data capable of being stored in the buffer.

The method may further include determining, based on the data loss rate of the first data, parity data including restoration information about the first data.

The determining of the transmission speed may include selecting, from the plurality of receiver terminals, a first receiver terminal having a lowest data loss rate of the first data, and determining a data loss rate caused by a buffer overflow according to the data loss rate of the first receiver terminal.

The determining of the transmission speed may include determining the transmission speed of the second data based on a round trip time (RTT) between the transmitter terminal and the first receiver terminal and the data loss rate caused by the buffer overflow.

The method may further include selecting, from the plurality of receiver terminals, a first receiver terminal having a lowest data loss rate of the first data and a second receiver terminal having a highest data loss rate of the first data, and determining a data loss rate caused by a channel error according to a difference between the data loss rate of the first receiver terminal and the data loss rate of the second receiver terminal.

The method may further include determining, based on the determined data loss rate caused by the channel error, parity data, the parity data including restoration information of the first data.

According to an aspect of another exemplary embodiment, a method of transmitting and receiving data through a receiver terminal, includes receiving first data from a transmitter terminal through one of a plurality of receiver terminals connected to the transmitter terminal; transmitting feedback information about the first data to the transmitter terminal, and receiving second data from the transmitter terminal according to a transmission speed determined from feedback information of at least one receiver terminal selected from the plurality of receiver terminals based on a data loss rate of the first data.

If the data loss rate of the at least one receiver terminal is a lowest data loss rate, the transmission speed may be determined based on the data loss rate of the receiver terminal and an RTT between the transmitter terminal and the receiver terminal.

The method may further include receiving first parity data that includes restoration information of the first data and is determined based on a data loss rate caused by a channel error between the plurality of receiver terminals and the transmitter terminal. The data loss rate caused by the channel error may be determined according to a difference between the data loss rate of the at least one receiver terminal and a data loss rate of an other receiver terminal having a highest data loss rate of the first data among the plurality of receiver terminals.

According to an aspect of another exemplary embodiment, a transmitter terminal includes a transmitter configured to transmit first data to a plurality of receiver terminals, a receiver configured to receive feedback information from the plurality of receiver terminals; a buffer configured to store data including the first data, and a controller configured to determine a transmission speed of second data based on at least one selected from feedback information of a receiver terminal selected from the plurality of receiver terminals based on a data loss rate of the first data and variation information of data stored in the buffer. The transmitter may be configured to transmit the second data to the plurality of receiver terminals according to the determined transmission speed.

The controller may be further configured to determine a transmission speed of the first data based on an amount of data transmitted to at least one of the plurality of receiver terminals for a preset time and determine the transmission speed of the second data based on the transmission speed of the first data and an amount of data capable of being stored in the buffer.

The controller may be further configured to determine parity data, the parity data including restoration information about the first data based on a data loss rate of the first data.

The controller may be further configured to select a first receiver terminal having a lowest data loss rate of the first data from the plurality of receiver terminals and determine a data loss rate caused by a buffer overflow according to a data loss rate of the first receiver terminal.

The controller may be further configured to determine the transmission speed of the second data based on an RTT between the transmitter terminal and the first receiver terminal and the data loss rate occurring due to the buffer overflow.

The controller may be further configured to select a first receiver terminal having a lowest data loss rate of the first data and a second receiver terminal having a highest data loss rate of the first data from the plurality of receiver terminals and determine a data loss rate caused by a channel error according to a difference between a data loss rate of the first receiver terminal and a data loss rate of the second receiver terminal.

The controller may be further configured to determine parity data including restoration information of the first data based on the determined data loss rate caused by the channel error.

According to an aspect of another exemplary embodiment, a receiver terminal includes: a receiver configured to receive first data from a transmitter terminal; a controller configured to generate feedback information about the first data; and a transmitter configured to transmit the feedback information about the first data to the transmitter terminal. The receiver may be configured to receive second data from the transmitter terminal according to a transmission speed determined from feedback information of a receiver terminal selected from the plurality of receiver terminals based on a data loss rate of the first data.

If the data loss rate of the receiver terminal is a lowest data loss rate among the plurality of receiver terminals, the transmission speed may be determined based on the data loss rate of the receiver terminal and an RTT between the receiver terminal and the transmitter terminal.

The receiver may be further configured to receive first parity data that includes restoration information of the first data and is determined based on a data loss rate occurring due to a channel error between the plurality of receiver terminals and the transmitter terminal. The data loss rate caused by the channel error may be determined according to a difference between the data loss rate of the receiver terminal and a data loss rate of a receiver terminal having a highest data loss rate of the first data among the plurality of receiver terminals.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
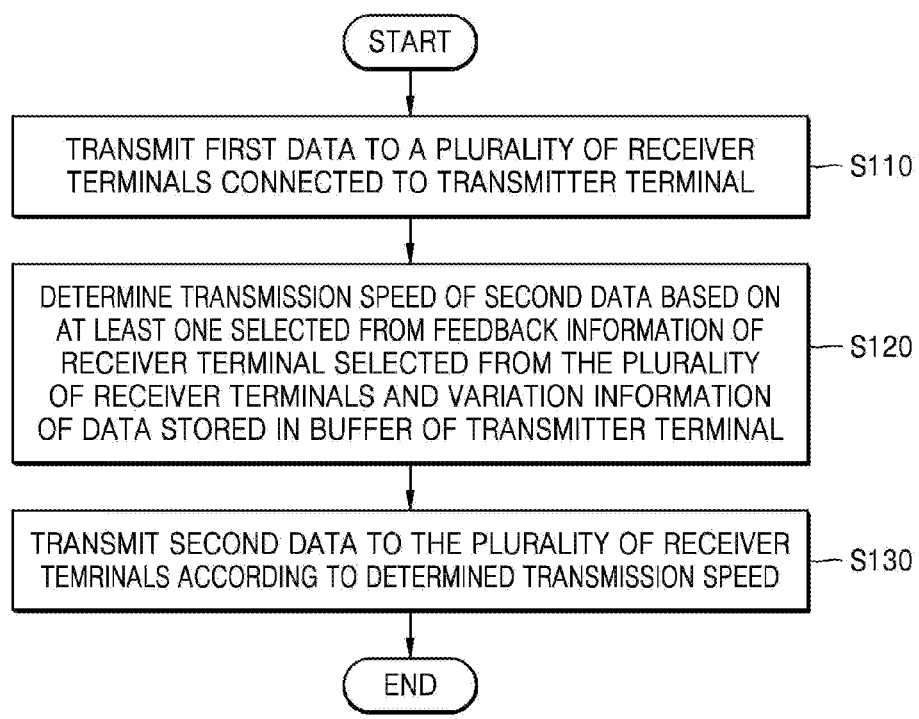
FIG. 1 is a flowchart of a method of transmitting and receiving data through a transmitter terminal according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. Expressions such as "at least one of," when preceding a list of elements, modify the entire list of elements and do not modify the individual elements of the list.

The terms used herein will be described in brief, and the exemplary embodiments will be described in detail.

The terms used herein are general terms that are currently widely used in consideration of functions in the exemplary embodiments but may vary according to intentions of those of ordinary skill in the art, precedents, appearances of new technologies, or the like. Also, the applicant may arbitrarily select terms in a particular case, and meanings of the terms corresponding to this case will be described in detail in the description of the present invention. Therefore, the terms used herein may be defined based on meanings thereof and the overall contents of the exemplary embodiments not based on names of simple terms.

When a part "comprises" an element in the specification, this may mean that the part may not exclude and may further include other elements as long as there is no contrary description. The term "unit", "module", or the like used herein refers to a unit that processes at least one function or operation. This may be embodied as hardware, software, or a combination of the hardware and the software.

FIG. 1 is a flowchart of a method of transmitting and receiving data through a transmitter terminal according to an exemplary embodiment.

In operation S110, the transmitter terminal transmits first data to a plurality of receiver terminals connected to the transmitter terminal.

The transmitter terminal is a computer device that can compute data and can perform a wired or wireless communication. The transmitter terminal may communicate with the plurality of receiver terminals. For example, the transmitter terminal may form an ad-hoc network with the plurality of receiver terminals to communicate with the plurality of receiver terminals.

The transmitter terminal according to the present exemplary embodiment may transmit the first data to each of the plurality of receiver terminals through a multicast method. Here, the multicast method may include a protocol that transmits feedback information to the transmitter terminal whenever receiving data from the plurality of receiver terminals. According to another exemplary embodiment, the multicast method may include a protocol that transmits feedback information to the transmitter terminal whenever sensing a data loss from the plurality of receiver terminals. According to another exemplary embodiment, the multicast method may include a protocol that uses a coding algorithm, such as a Forward Error Correction (FEC), to restore lost data. According to another exemplary embodiment, the multicast method may include a protocol that includes a combination of two or more protocols described above.

The first data transmitted from the transmitter terminal may be formed as at least one packet having a preset size but is not limited thereto.

In operation S120, the transmitter terminal determines a transmission speed of second data transmitted after the first data, by using at least one selected from feedback information of a receiver terminal selected from the plurality of receiver terminals based on a data loss rate of the first data and variation information of data stored in a buffer of the transmitter terminal.

The transmitter terminal according to the present exemplary embodiment may receive feedback information about the first data from the plurality of receiver terminals. Here, the feedback information may include information about a data loss rate, a data reception time, etc.

The transmitter terminal may estimate a cause of a data loss based on the information about the data loss rate, the data reception time, etc. when the information is included in the received feedback information. Here, the data loss between the plurality of receiver terminals may occur if a channel gain of a network is low or buffers of the receiver terminals lack storage spaces. The transmitter terminal may determine the transmission speed of the second data transmitted to the plurality of receiver terminals after the first data, according to the estimated cause of the data loss.

According to another exemplary embodiment, the transmitter terminal may monitor variations in the data stored in the buffer of the transmitter terminal. For example, if an amount of the data stored in the buffer varies, the transmitter terminal may acquire information about the amount of the data from a wireless network interface card (WNIC) connected to the buffer. The transmitter terminal may acquire variation information of the data stored in the buffer based on the information of the amount of the data acquired from the WNIC.

The transmitter terminal may determine a transmission speed of the first data transmitted to the plurality of receiver terminals, based on the variation information of the data stored in the buffer. Also, the transmitter terminal may check an amount of data that was additionally stored in the buffer, based on the variation information of the data stored in the buffer.

The transmitter terminal may determine the transmission speed of the second data based on the transmission speed of the first data and the amount of the data that was additionally stored in the buffer.

According to another exemplary embodiment, the transmitter terminal may combine feedback information of the receiver terminal selected based on the data loss rate with the variation information of the data stored in the buffer of the transmitter terminal to determine the transmission speed of the second data.

In operation S130, the transmitter terminal transmits the second data to the plurality of receiver terminals according to the determined transmission speed.

According to an exemplary embodiment, the transmitter terminal may determine the number of packets to include in the second data according to the determined transmission speed. For example, if the determined transmission speed is slower than the transmission speed of the first data, the transmitter terminal may decrease the number of packets included in the second data to have less packets than in the first data. According to another exemplary embodiment, if the determined transmission speed is faster than the transmission speed of the first data, the transmitter terminal may increase the number of packets included in the second data to have more packets than in the first data.

Figure 2:
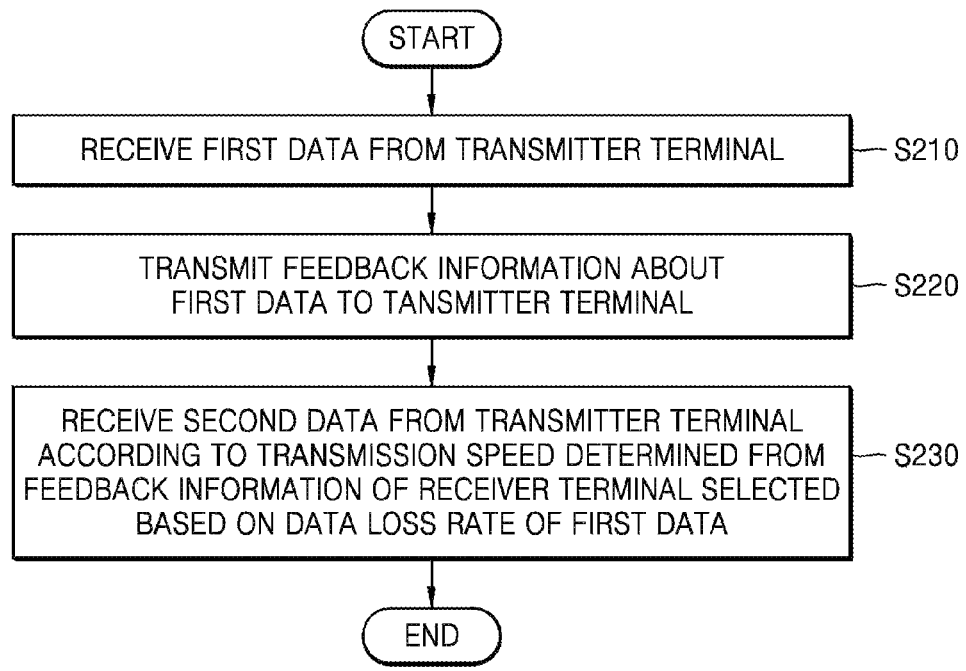
FIG. 2 is a flowchart of a method of transmitting and receiving data through a receiver terminal according to an exemplary embodiment.

FIG. 2 is a flowchart of a method of transmitting and receiving data through a receiver terminal according to an exemplary embodiment.

In operation S210, the receiver terminal receives first data from a transmitter terminal.

According to an exemplary embodiment, the receiver terminal may receive the first data from the transmitter terminal by using a multicast method. Here, the transmitter terminal may be connected to a plurality of receiver terminals. The plurality of receiver terminals may respectively receive the first data from the transmitter terminal.

In operation S220, the receiver terminal transmits feedback information about the first data to the transmitter terminal. Here, according to an exemplary embodiment, the first data may include at least one packet having a preset size.

According to an exemplary embodiment, the receiver terminal may acquire information about a reception time of the first data.

Also, the receiver terminal may identify the received packet by using an identification value of the at least one packet included in the first data. For example, if three of five packets included in the first data are lost, the receiver terminal may acquire identification information of each of the two packets that are not lost. Also, the receiver terminal may acquire identification information of a lost packet. According to another exemplary embodiment, the receiver terminal may determine a data loss rate of the first data based on the number of packets included in the first data and the number of lost packets.

The receiver terminal may generate feedback information including at least one selected from the identification information of the lost packet of the first data and the data loss rate of the first data. Here, the generated feedback information may include identification information of the receiver terminal so as to enable the transmitter terminal to identify the receiver terminal that transmits the feedback information to the transmitter terminal.

The receiver terminal may transmit the generated feedback information to the transmitter terminal.

In operation S230, the receiver terminal receives second data from the transmitter terminal according to a transmission speed determined from the feedback information of the receiver terminal selected from the plurality of receiver terminals based on the data loss rate of the first data.

The receiver terminal may receive the second data from the transmitter terminal according to a transmission speed that increases or decreases more than the transmission speed of the first data, based on the feedback information. According to another exemplary embodiment, the receiver terminal may receive the second data from the transmitter terminal according to the same transmission speed as the transmission speed of the first data.

Figure 3:
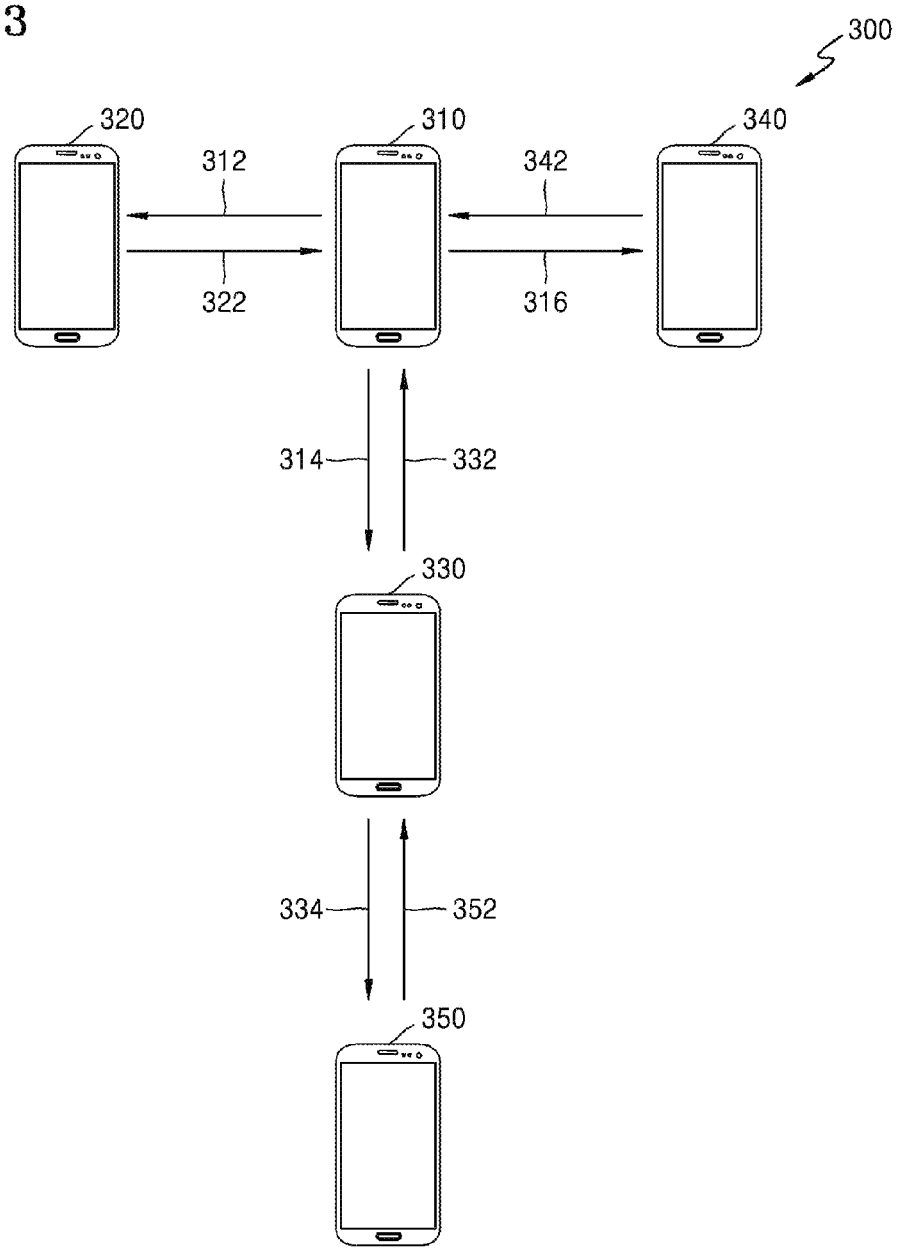
FIG. 3 is a view illustrating a system that determines a transmission speed of data based on feedback information acquired from a plurality of receiver terminals through a transmitter terminal to transmit and receive the data, according to an exemplary embodiment.

FIG. 3 is a view illustrating a method of determining a transmission speed of data through a transmitter terminal based on feedback information acquired from a plurality of receiver terminals in a system 300 that transmits and receives the data, according to an exemplary embodiment.

The system 300 that transmits and receives data according to the present exemplary embodiment may include a transmitter terminal 310, a plurality of receiver terminals 320, 340, and 350, and a relay device 330.

The system 300 of FIG. 3 includes elements associated with the present exemplary embodiment. Therefore, the system 300 of FIG. 3 may further include other common elements besides the elements of FIG. 3.

The transmitter terminal 310, the plurality of receiver terminals 320, 340, and 350, and the relay device 330 may form a multi-hop ad-hoc network. Here, the transmitter terminal 310 may be connected to the receiver terminal 320, the relay device 330, and the receiver terminal 340. The receiver terminal 350 may be connected to the relay device 330. The receiver terminal 350 may receive first data from the transmitter terminal 310 through the relay device 330.

On the multi-hop ad-hoc network, the transmitter terminal 310 may transmit the data to the plurality of receiver terminals 320, 340, and 350 through a multicast method.

The receiver terminal 320 may generate feedback information about a data loss rate of the first data or a reception time of the first data. The receiver terminal 320 may transmit the generated feedback information to the transmitter terminal 310.

The relay device 330 may transmit the first data to the receiver terminal 350. Here, the relay device 330 may transmit and receive data between the transmitter terminal 310 and the receiver terminal 350. However, this is an exemplary embodiment, and the relay device 300 may also independently acquire the first data received from the transmitter terminal 310.

The receiver terminal 340 may generate feedback information about the data loss rate of the first data or a reception time of the first data. The receiver terminal 340 may transmit the generated feedback information to the transmitter terminal 310.

The receiver terminal 350 may receive the first data of the transmitter terminal 310 from the relay device 330. The receiver terminal 350 may generate feedback information about the data loss rate of the first data or a reception time of the first data. The receiver terminal 350 may transmit the generated feedback information to the relay device 330. Here, the relay device 330 may transmit the feedback information, which is received from the receiver terminal 350, to the transmitter terminal 310.

The transmitter terminal 310 may determine a transmission speed of second data transmitted to the receiver terminals 320, 340, and 350 after the first data, based on pieces of feedback information of the receiver terminals 320, 340, and 350.

According to an exemplary embodiment, the transmitter terminal 310 may select some from the pieces of the feedback information received from the receiver terminals 320, 340, and 350 to determine the transmission speed of the second data. For example, the transmitter terminal 310 may determine the transmission speed of the second data based on the data loss rate included in the feedback information. This will be described in detail later with reference to FIG. 4.

According to an exemplary embodiment, the transmitter terminal 310 may transmit the second data to the plurality of receiver terminals 320, 340, and 350 according to the determined transmission speed.

Figure 4:
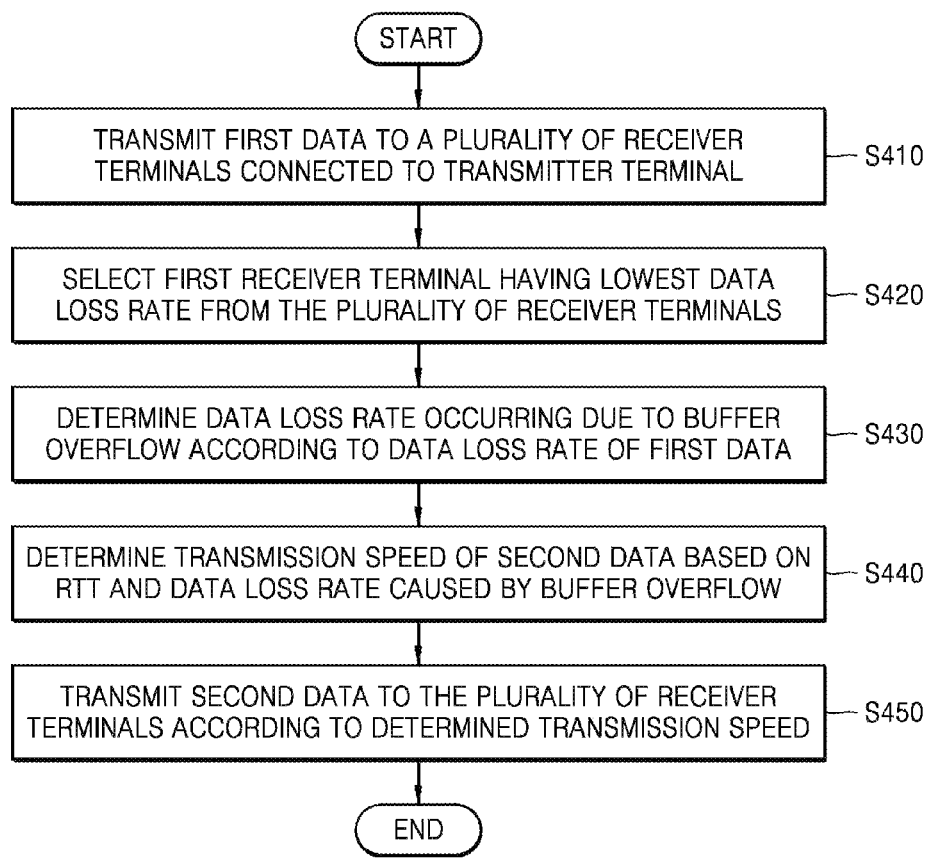
FIG. 4 is a flowchart of a method of determining a transmission speed of data based on feedback information acquired from a plurality of receiver terminals through a transmitter terminal, according to an exemplary embodiment.

FIG. 4 is a flowchart of a method of determining a transmission speed of data through the transmitter terminal 310 based on feedback information acquired from the plurality of receiver terminals 320, 340, and 350, according to an exemplary embodiment.

In operation S410, the transmitter terminal 310 may transmit first data to the plurality of receiver terminals 320, 340, and 350 connected to the transmitter terminal 310.

Operation S410 may correspond to operation S110 described above with reference to FIG. 1.

In operation S420, the transmitter terminal 310 may select a first receiver terminal having a lowest data loss rate of the first data based on pieces of received feedback information of the plurality of receiver terminals 320, 340, and 350.

For example, the transmitter terminal 310 may receive feedback information indicating that the receiver terminal 320 receives four of five packets included in the first data. According to another exemplary embodiment, the transmitter terminal 310 may receive feedback information indicating that the receiver terminal 340 receives two of the five packets included in the first data. The transmitter terminal 310 may also receive feedback information indicating that the receiver terminal 350 receives one of the five packets included in the first data. The transmitter terminal 310 may select the receiver terminal 320 having the lowest data loss rate as the first receiver terminal based on pieces of the received feedback information.

The feedback information may include identification information indicating the receiver terminal that transmits the feedback information. The feedback information may include information about a reception time of data.

In operation S430, the transmitter terminal 310 may determine a data loss rate occurring due to a buffer overflow, according to the data loss rate of the first receiver terminal 320.

The transmitter terminal 310 may determine that a channel gain between the first receiver terminal 320 having the lowest data loss rate and the transmitter terminal 310 is highest. The transmitter terminal 310 may also determine that data of the first receiver terminal 320 having the lowest data loss rate is lost due to a buffer overflow.

According to an exemplary embodiment, the transmitter terminal 310 may consider a data loss rate of the selected first receiver terminal 320 not data loss rates of the receiver terminals 320, 340, and 350 that transmit feedback information to determine a data loss rate due to a buffer overflow.

The transmitter terminal 310 may determine the data loss rate of the first receiver terminal 320 having the lowest data loss rate as the data loss rate occurring due to the buffer overflow.

In operation S440, the transmitter terminal 310 may determine a transmission speed of second data based on a round trip time (RTT) of the first data and the data loss rate occurring due to the buffer overflow.

Here, the transmitter terminal 310 may check the RTT of the first data from the feedback information of the first receiver terminal 320

The transmitter terminal 310 may determine the transmission speed of the second data based on Equations 1 through 9 below.

$D_i$ may be determined based on Equation 1 below:

$$D_i = N_i C_i + \tfrac{1}{2} C_i (C_i - 1) \tag{1}$$

wherein $D_i$ denotes a total amount of data transmitted in interval i. For example, the data amount may be determined according to the number of transmitted data segments or the like. Here, an interval may be determined according to a time when a data loss occurs. For example, a loss of data transmitted at time a may occur at time b and then may occur at time c. In this case, a time from the time a to the time b may correspond to a first interval, and a time from the time b to the time c may correspond to a second interval.

$C_i$ denotes an RTT when a data loss occurs in the interval i. For example, if five RTTs exist in the first interval, and a data loss occurs at the fifth RTT, $C_i$ may be 5. Ni denotes an amount of data averagely transmitted per RTT in the interval i.

$N_i$ may be determined based on Equation 2 below:

$$N_i = N_{i-1}(1 - p_i) + \frac{1}{C_i} \sum_{k=0}^{C_i - 1} k \tag{2}$$

wherein $p_i$ denotes a probability that a data loss will occur in the interval i. Also, k may be determined based on an amount of data increased in the unit of RTT in each interval.

The transmitter terminal 310 may determine a data amount that is not lost based on Equation 3 below:

$$E[b_i] = \Sigma k (1 - p_i)^{k-1} p_i \tag{3}$$

wherein $E[b_i]$ denotes the amount of data that is not lost. Further, $p_i$ and k denote a probability that the data loss will occur and a data amount that increases in the unit of RTT, respectively, as described above in Equation 2.

The total amount of data transmitted in the interval i may be determined based on Equation 4 below:

$$D_i = \frac{1}{1 - p_i}\left(\frac{1}{p_i} - 1\right) \tag{4}$$

Also, if the probability that the data loss occurring in each RTT in the interval i is independent, the transmitter terminal 310 may determine an average data loss amount at an RTT based on Equation 5 below:

$$E[C] = 2pE[N] + 1 \tag{5}$$

wherein E[C] may denote the average data loss amount at the RTT. Also, the transmitter terminal 310 may determine an average data transmission amount in the interval i based on Equation 6:

$$E[D] = E[N](2pE[N] + 1)(1 + p) \tag{6}$$

wherein E[D] may denote the average data transmission amount in the interval i. Here, E[N] may be determined based on Equations 7 and 8, below. E[N] denotes an average data transmission amount per RTT in all intervals.

$$\frac{1}{1-p}\left(\frac{1}{o} - 1\right) = E[N](2pE[N] + 1)(1 + p) \tag{7}$$

$$E[N] = \frac{-(1+p) + \sqrt{(1+p)^2 + 8p(1+p)\left(\frac{1}{p} - 1\right)\left(\frac{1}{1-p}\right)}}{4p(1+p)} \tag{8}$$

According to an exemplary embodiment, the transmitter terminal 310 may determine a transmission speed based on Equation 9 below:

$$S_i = \frac{E[N]}{RTT_i} \cdot \text{nonminal\_packet\_size} \tag{9}$$

wherein $S_i$ denotes the transmission speed. $RTT_i$ denotes an RTT in the interval i, and nominal_packet_size denotes an average data segment size.

The method of determining the transmission speed of the second data through the transmitter terminal 310 is not limited to the above-described method.

In operation S450, the transmitter terminal 310 may transmit the second data to the plurality of receiver terminals 320, 340, and 350 connected to the transmitter terminal 310 according to the determined transmission speed. According to an exemplary embodiment, the transmitter terminal 310 may transmit the second data to the plurality of receiver terminals 320, 340, and 350 according to the determined transmission speed through a multicast method.

Figure 5:
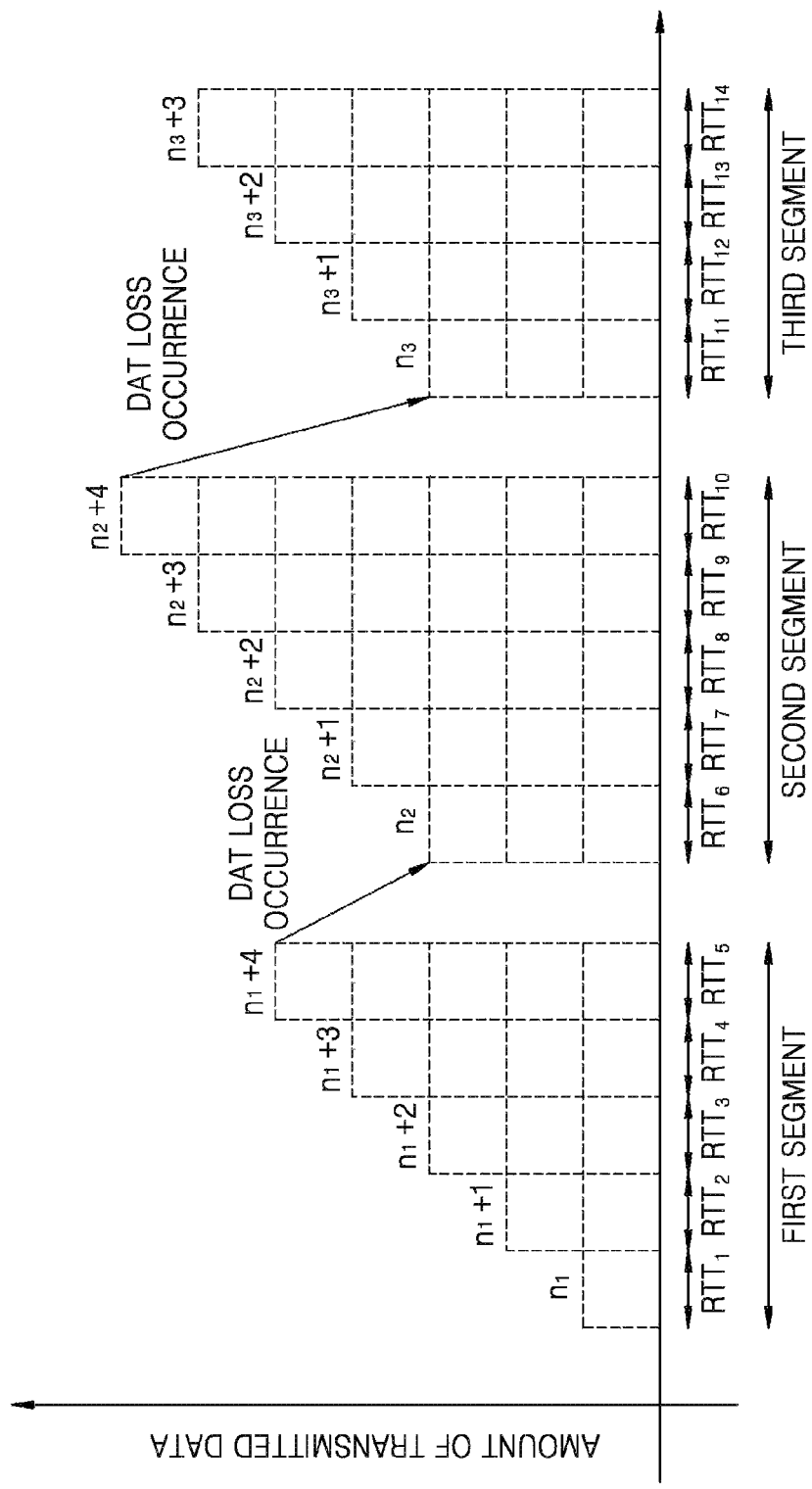
FIG. 5 is a graph illustrating an amount of data transmitted from a transmitter terminal, according to an exemplary embodiment.

FIG. 5 is a graph illustrating an amount of data transmitted from the transmitter terminal 310, according to an exemplary embodiment.

Referring to FIG. 5, the x axis of the graph denotes an elapsed time, and the y axis denotes an amount of data transmitted from the transmitter terminal 310 to the plurality of receiver terminals 320, 340, and 350.

The transmitter terminal 310 may increase the amount of data transmitted to the plurality of receiver terminals 320, 340, and 350 at each RTT before a data loss occurs. For example, the transmitter terminal 310 may increase data, which is transmitted at each RTT, by one packet.

The transmitter terminal 310 may transmit data including n1 packets to the plurality of receiver terminals 320, 340, and 350 at RTT1. The transmitter terminal 310 may also transmit the data, which is increased by one packet at each of RTT2 through RTT5, to the plurality of receiver terminals 320, 340, and 350.

The transmitter terminal 310 may determine whether data is lost, based on feedback information. The transmitter terminal 310 may check that data is lost at RTT5, based on the feedback information. The transmitter terminal 310 may decrease an amount of data transmitted at RTT6 after determining that data is lost at RTT5. For example, the transmitter terminal 310 may decrease $n_1+4$ packets, which are transmitted at RTT5, to $n_2$ packets.

As the data transmitted at RTT5 is lost, a second interval may start from RTT6. Here, RTT1 through RTT5 may form a first interval. The transmitter terminal 310 may transmit $n_2$ packets to the plurality of receiver terminals 320, 340, and 350 at RTT6 based on feedback information received from the plurality of receiver terminals 320, 340, and 350. The transmitter terminal 310 may also transmit data, which is increased by one packet at each RTT from RTT6 to RTT10, to the plurality of receiver terminals 320, 340, and 350. The second interval may include RTTs from RTT6 to RTT10 at which data is lost.

As data transmitted at RTT10 is lost, a third interval may start from RTT11. The transmitter terminal 310 may transmit $n_3$ packets to the plurality of receiver terminals 320, 340, and 350 at RTT11. The transmitter terminal 310 may also transmit data, which is increased by one packet at each RTT from RTT11 to RTT14, to the plurality of receiver terminals 320, 340, and 350. A third interval may include RTTs from RTT11 to RTT14 at which data is lost.

Figure 6:
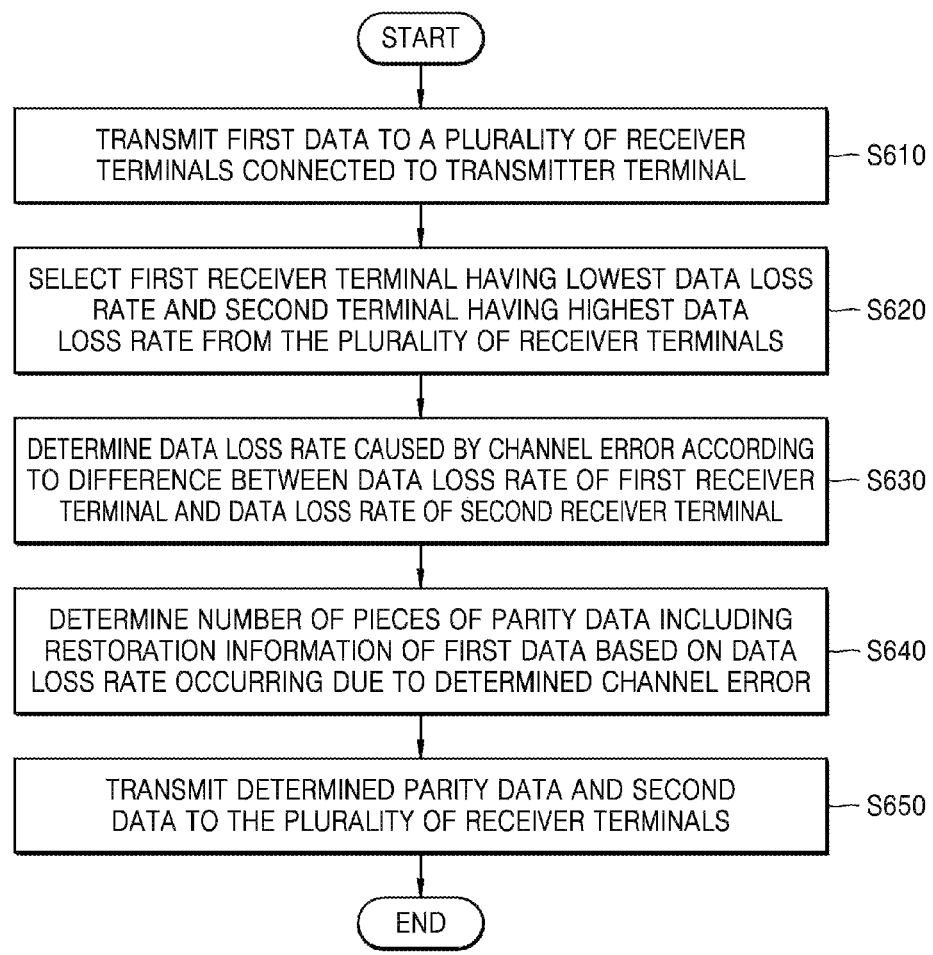
FIG. 6 is a flowchart of a method of transmitting parity data based on feedback information received through a transmitter terminal, according to an exemplary embodiment.

FIG. 6 is a flowchart of a method of transmitting parity data based on feedback information received through the transmitter terminal 310, according to an exemplary embodiment.

In operation S610, the transmitter terminal 310 may transmit first data to the plurality of receiver terminals 320, 340, and 350 connected to the transmitter terminal 310.

Operation S610 may correspond to S110 described above with reference to FIG. 1.

In operation S620, the transmitter terminal 310 may select a first receiver terminal (e.g., 320) having a lowest data loss rate and a second receiver terminal (e.g., 350) having a highest data loss rate from the plurality of receiver terminals 320, 340, and 350 based on feedback information received from the plurality of receiver terminals 320, 340, and 350.

The transmitter terminal 310 may acquire feedback information of first data of each of the plurality of receiver terminals 320, 340, and 350. Here, the feedback information may include identification information of a lost one of at least one packets included in the first data or identification information of a received packet of the at least one packets. The transmitter terminal 310 may determine data loss rates of the plurality of receiver terminals 320, 340, and 350 by using the feedback information received from the plurality of receiver terminals 320, 340, and 350.

The feedback information may include information about an interval where a loss of a packet occurs.

The transmitter terminal 310 may select the first receiver terminal (e.g., 320) having the lowest data loss rate and the second receiver terminal (e.g., 350) having the highest data loss rate based on the determined data loss rates of the plurality of receiver terminals 320, 340, and 350.

In operation S630, the transmitter terminal 310 may determine a data loss rate occurring due to a channel error according to a difference between the data loss rate of the first receiver terminal (e.g., 320) and the data loss rate of the second receiver terminal (e.g., 350).

The transmitter terminal 310 may estimate that a channel gain between the transmitter terminal 310 and the first receiver terminal (e.g., 320) having the lowest data loss rate is higher than a channel gain between the other receiver terminals 340 and 350 and the transmitter terminal 310. Therefore, the transmitter terminal 310 may determine that data is lost in the first receiver terminal (e.g., 320) due to a buffer overflow.

The transmitter terminal 310 may estimate that a channel gain between the transmitter terminal 310 and the second receiver terminal (e.g., 350) having the highest data loss rate is lower than a channel gain between the other receiver terminals 320 and 340 and the transmitter terminal 310. Therefore, the transmitter terminal 310 may determine that data is lost in the second receiver terminal (e.g., 350) due to a buffer overflow and a channel error.

For example, if the first receiver terminal (e.g., 320) receives five of seven packets included in the first data, and the second receiver terminal (e.g. 350) receives two packets, the transmitter terminal 310 may determine that two packets are lost due to a buffer overflow, and three packets are lost due to a channel error.

The transmitter terminal 310 may determine a data loss rate occurring due to a buffer overflow or a channel error in consideration of the feedback information of the first receiver terminal (e.g., 320) having the lowest data loss rate and the feedback information of the second receiver terminal (e.g., 350) having the highest data loss rate among the received feedback information of the plurality of receiver terminals 320, 340, and 350.

In operation S640, the transmitter terminal 310 may determine parity data including restored data of the first data based on the estimated data loss rate occurring due to the channel error.

According to an exemplary embodiment, the transmitter terminal 310 may determine the number of pieces of parity data according to the number of packets of the first data which are lost due to a channel error. For example, if three packets included in the first data are lost due to a channel error, the transmitter terminal 310 may generate three or more pieces of parity data. According to another exemplary embodiment, the transmitter terminal 310 may aggregate some of the pieces of the parity data included in the first data with the second data to transmit some of the pieces of the parity data to the plurality of receiver terminals 320, 340, and 350.

According to an exemplary embodiment, the transmitter terminal 310 may check a time interval at which packets included in the first data are lost, based on the feedback information of the second receiver terminal (e.g., 350). The transmitter terminal 310 may determine a transmission cycle of the parity data so that the transmission cycle of the parity data does not to correspond to the time interval at which the packets included in the first data are lost.

In operation S650, the transmitter terminal 310 may transmit the determined parity data and the second data to the plurality of receiver terminals 320, 340, and 350.

According to an exemplary embodiment, the transmitter terminal 310 may transmit the parity data and the second data to the plurality of receiver terminals 320, 340, and 350 according to the determined transmission speed. Here, the method of determining the transmission speed through the transmitter terminal 310 may correspond to the method described above with reference to FIG. 4.

Figure 7:
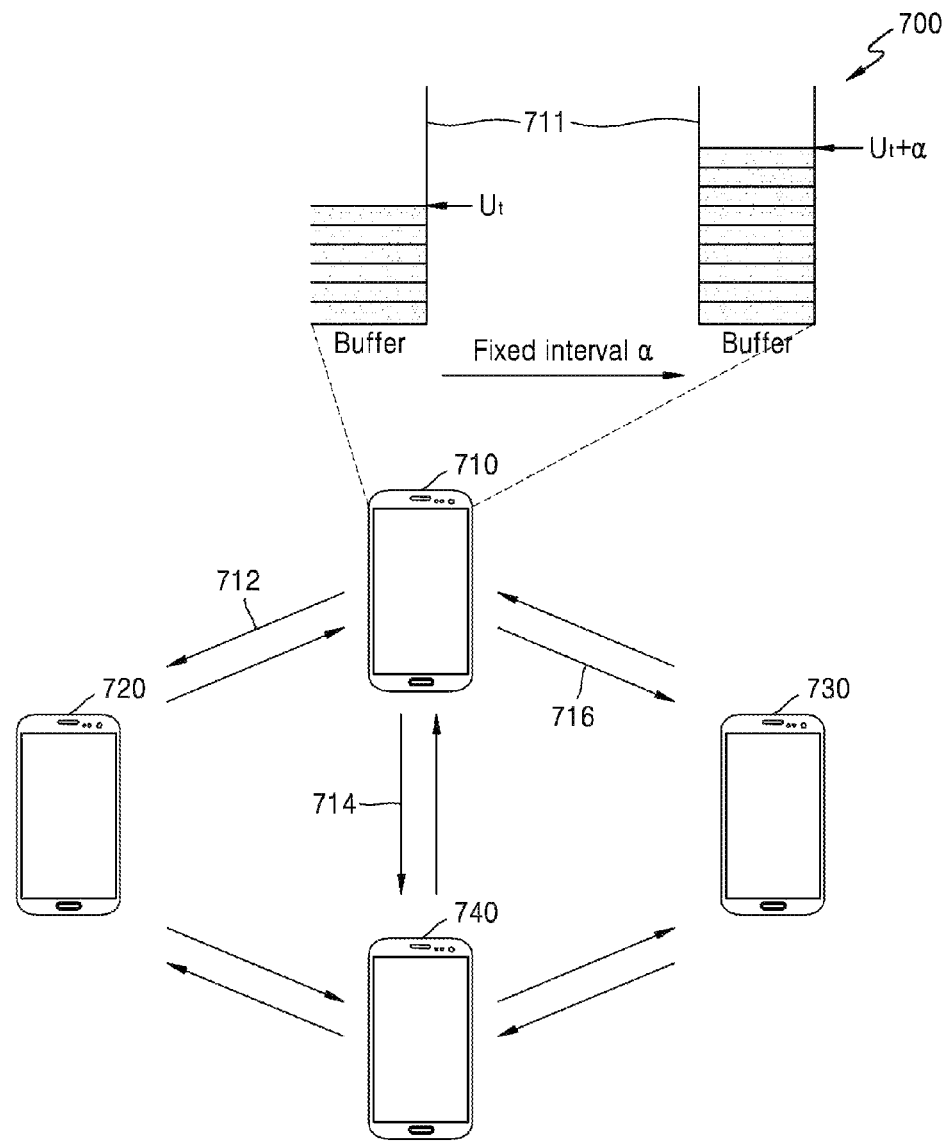
FIG. 7 is a view illustrating a method of determining a transmission speed of data through a transmitter terminal based on an amount of data stored in a buffer in a system that transmits and receives data, according to an exemplary embodiment.

FIG. 7 is a view illustrating a method of determining a transmission speed of data through a transmitter terminal 710 based on an amount of data stored in a buffer 711 in a system 700 that transmits and receives data, according to another exemplary embodiment.

According to an exemplary embodiment, the system 700 may include the transmitter terminal 710 and a plurality of receiver terminals 720, 730, and 740

The system 700 of FIG. 7 may include elements associated with the present exemplary embodiment. Therefore, the system 700 may further include other common elements besides the elements of FIG. 7.

The transmitter terminal 710 and the plurality of receiver terminals 720, 730, and 740 may form a single-hop ad-hoc network. Here, the transmitter terminal 710 may be connected to the first receiver terminal 720, the second receiver terminal 730, and the third receiver terminal 740.

On the single-hop ad-hoc network, the transmitter terminal 710 may transmit data to the first, second, and third receiver terminals 720, 730, and 740 through a multicast method.

The transmitter terminal 710 may monitor variations in data stored in the buffer 711 of the transmitter terminal 710. For example, if the transmitter terminal 710 transmits the data to the plurality of receiver terminals 720, 730, and 740, and an amount of the data stored in the buffer 711 decreases, the transmitter terminal 710 may acquire information about the data amount from a WNIC connected to the buffer 711. Also, if the transmitter terminal 710 acquires the data, and the amount of the data stored in the buffer 711 increases, the transmitter terminal 710 may acquire the information about the data amount from the WNIC.

On the single-hop ad-hoc network, the data may be directly transmitted and received between the transmitter terminal 710 and the plurality of receiver terminals 720, 730, and 740 without a relay device. Therefore, the transmitter terminal 710 may monitor variations in data stored in the transmitter terminal 710 to determine a transmission speed of the data without considering a data loss that may occur in the relay device.

According to an exemplary embodiment, the transmitter terminal 710 may periodically monitor the variations in the data stored in the buffer 711 to determine the transmission speed of the data. The transmitter terminal 710 may determine the transmission speed of the data so as to enable an input speed of the data to remain lower than or equal to an amount of data transmitted to the plurality of receiver terminals 720, 730, and 740.

However, this is an exemplary embodiment, and thus the input speed of the data may not remain lower than or equal to the transmission speed of the data at all times. The transmitter terminal 710 may adaptively control the transmission speed of the data based on an amount of data storable in the buffer 711 and the input speed of the data.

The transmitter terminal 710 may determine parity data for restoring the data based on feedback information respectively received from the plurality of receiver terminals 720, 730, and 740. The feedback information may include information about data loss rates of the plurality of receiver terminals 720, 730, and 740, times when receiving data, etc.

A method of determining parity data for restoring data through the transmitter terminal 710 based on feedback information respectively received from the plurality of receiver terminals 720, 730, and 740 will be described in more detail later with reference to FIG. 9.

Figure 8:
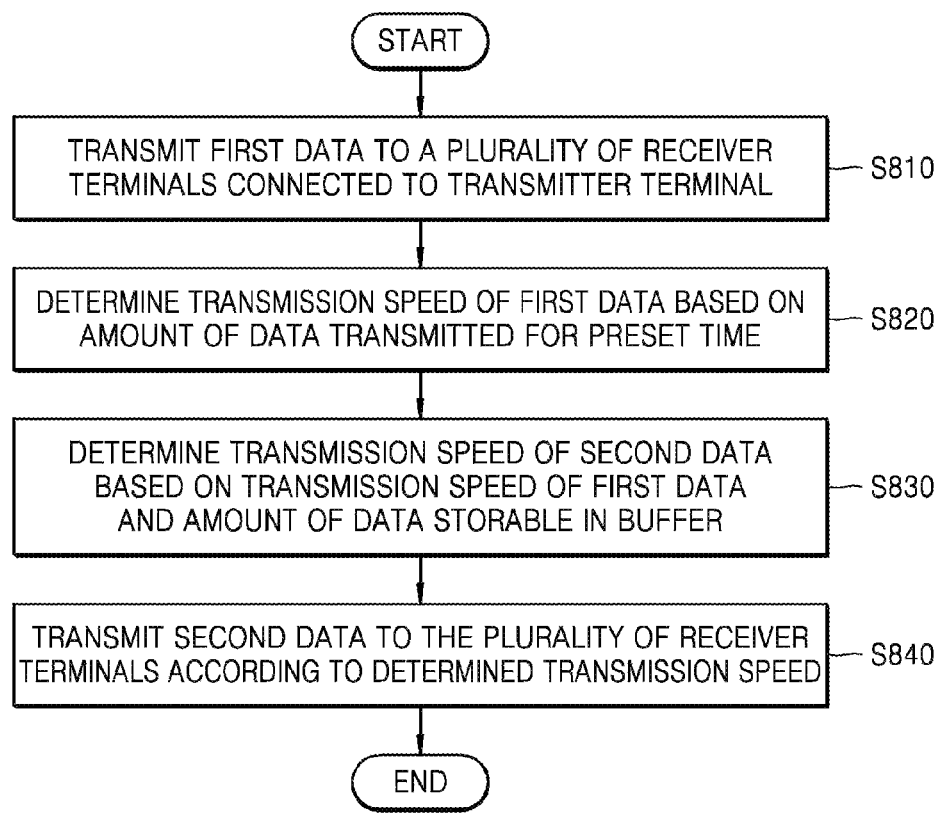
FIG. 8 is a flowchart of a method of determining a transmission speed of data through a transmitter terminal based on variation information of data stored in a buffer, according to an exemplary embodiment.

FIG. 8 is a flowchart of a method of determining a transmission speed of data through the transmitter terminal 710 based on variation information of data stored in the buffer 711, according to another exemplary embodiment.

In operation S810, the transmitter terminal 710 transmits first data to the plurality of receiver terminals 720, 730, and 740 connected to the transmitter terminal 710.

According to an exemplary embodiment, the transmitter terminal 710 may transmit the first data to each of the plurality of receiver terminals 720, 730, and 740 through a multicast method. The transmitter terminal 710 may form a single-hop ad-hoc network along with the plurality of receiver terminals 720, 730, and 740. The plurality of receiver terminals 720, 730, and 740 are final transmission destinations of the first data transmitted from the transmitter terminal 710.

In operation S820, the transmitter terminal 710 may determine a transmission speed of the first data based on variations in an amount of data stored in the buffer 711 for a preset time.

According to an exemplary embodiment, the transmitter terminal 710 may acquire information about the variations in the amount of data from a WNIC connected to the buffer 711. This is an exemplary embodiment, and thus the transmitter terminal 710 may acquire the information about the variations in the amount of data from a processor connected to the buffer 711.

In operation S830, the transmitter terminal 710 may determine a transmission speed of second data based on the transmission speed of the first data and an amount of data capable of being stored in the buffer 711.

The transmitter terminal 710 may determine the transmission speed of the second data based on Equation 10 below:

$$S_{source} = \hat{S}_{source} + \frac{U_c + (U_1 - U_{t+a})}{a} \qquad (10)$$

wherein $\hat{S}_{source}$ denotes the transmission speed of the first data. Also, $U_c$ denotes variations in data from time t when transmitting the first data to time t+a, and $U_1$ denotes a capacity of a buffer. Ut+1 denotes an amount of data stored in the buffer 711 at time t+a.

According to another exemplary embodiment, if the transmitter terminal 710 starts transmitting data, the transmitter terminal 710 may determine a transmission speed of the data based on Equation 11 below:

$$S_{max} = \frac{D_a - U_{t+a} + U_t}{a} \qquad (11)$$

wherein $D_a$ denotes the number of packets to be transmitted. Also, $U_{t+a}$ denotes an amount of data stored in the buffer 711 at the time t+a, and $U_t$ denotes an amount of data stored in the buffer 711 at the time t.

In operation S840, the transmitter terminal 710 may transmit second data to the plurality of receiver terminals 720, 730, and 740 according to the determined transmission speed.

Operation S840 may correspond to operation S130 described above with reference to FIG. 1.

Figure 9:
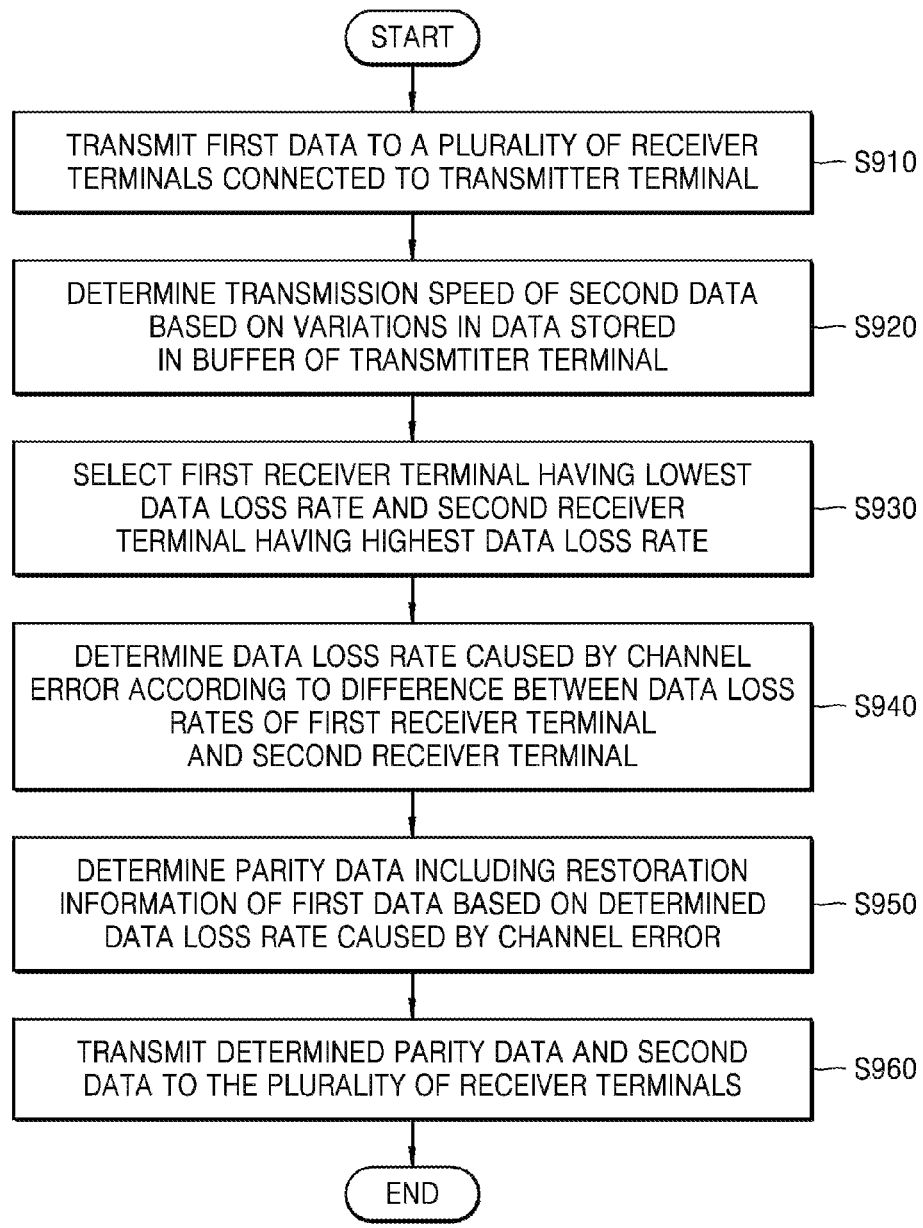
FIG. 9 is a flowchart of a method of transmitting data through a transmitter terminal based on an amount of data stored in a buffer and received feedback information, according to another exemplary embodiment.

FIG. 9 is a flowchart of a method of transmitting data through the transmitter terminal 710 based on an amount of data stored in the buffer 711 and the received feedback information, according to another exemplary embodiment.

In operation S910, the transmitter terminal 710 may transmit first data to the plurality of receiver terminals 720, 730, and 740 connected to the transmitter terminal 710.

Operation S910 may correspond to operation S810 described above with reference to FIG. 8.

In operation S920, the transmitter terminal 710 may determine a transmission speed of second data based on variations in an amount of data stored in the buffer 711.

Operation S920 may correspond to operation S830 described above with reference to FIG. 8.

In operation S930, the transmitter terminal 710 may select a first receiver terminal having a lowest data loss rate and a second receiver terminal having a highest data loss rate from the plurality of receiver terminals 720, 730, and 740 based on received feedback information of the plurality of receiver terminals 720, 730, and 740.

The transmitter terminal 710 may receive feedback information of the first data respectively from the plurality of receiver terminals 720, 730, and 740. The transmitter terminal 710 may determine data loss rates of the plurality of receiver terminals 720, 730, and 740 by using the feedback information received from the plurality of receiver terminals 720, 730, and 740.

The transmitter terminal 710 may select a first receiver terminal (e.g., 720) having the lowest data loss rate and a second receiver terminal (e.g., 740) having the highest data loss rate based on the determined data loss rates of the plurality of receiver terminals 720, 730, and 740.

In operation S940, the transmitter terminal 710 may determine a data loss rate occurring due to a channel error according to a difference between the data loss rates of the first receiver terminal (e.g., 720) and the second receiver terminal (e.g., 740).

According to an exemplary embodiment, the transmitter terminal 710 may determine a difference between the number of packets lost from the second receiver terminal (e.g., 740) and the number of packets lost from the first receiver terminal (e.g., 720) as the number of packets lost due to a channel error.

In operation S950, the transmitter terminal 710 may determine parity data including restoration information of the first data based on the determined data loss rate occurring due to the channel error.

According to an exemplary embodiment, the transmitter terminal 710 may determine the number of pieces of parity data according to the number of packets of the first data lost due to the channel error.

Also, according to an exemplary embodiment, the transmitter terminal 710 may check a time interval at which the packets included in the first data are lost, based on the feedback information of the second receiver terminal (e.g., 740). The transmitter terminal 710 may determine a transmission cycle of the parity data so that the packets included in the first data do not correspond to the time interval at which the packets are lost.

In operation S960, the transmitter terminal 710 may transmit the determine parity data and the second data to the plurality of receiver terminals 720, 730, and 740.

According to an exemplary embodiment, the transmitter terminal 710 may transmit the parity data and the second data to the plurality of receiver terminals 720, 730, and 740 according to the transmission speed determined in operation S720.

Figure 10:
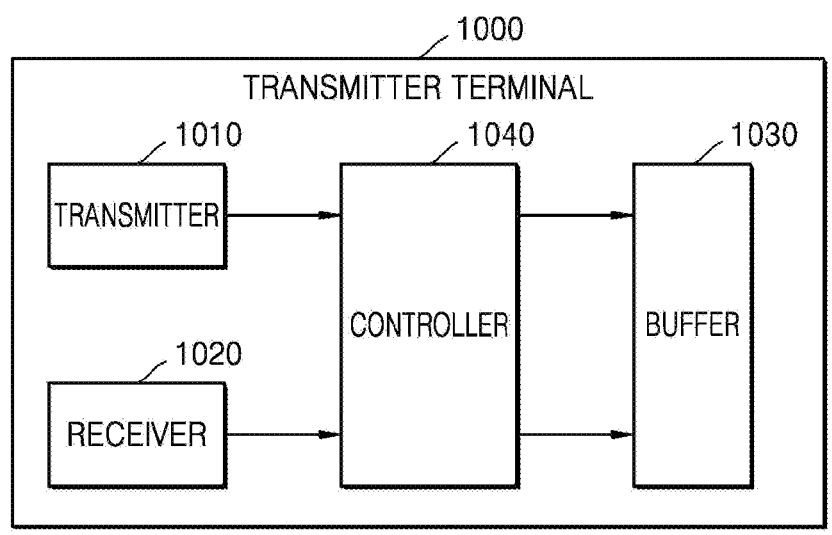
FIG. 10 is a block diagram of a transmitter terminal according to an exemplary embodiment.

FIG. 10 is a block diagram of a transmitter terminal 1000 according to an exemplary embodiment.

Referring to FIG. 10, the transmitter terminal 1000 may include a transmitter 1010, a receiver 1020, a buffer 1030, and a controller 1040.

The transmitter terminal 1000 of FIG. 10 may include elements associated with the present exemplary embodiment. Therefore, the transmitter terminal 1000 may further include other common elements besides the elements of FIG. 10.

The transmitter 1010 transmits first data to a plurality of receiver terminals connected to the transmitter terminal 1000. The transmitter 1010 may also transmit second data according to a transmission speed determined by the controller 1040 after transmitting the first data.

The receiver 1020 receives feedback information about the first data from the plurality of receiver terminals. According to an exemplary embodiment, the receiver 1020 may receive feedback information from a receiver terminal whenever the receiver terminal receives data. According to another exemplary embodiment, the receiver 1020 may receive feedback information from a receiver terminal whenever data is lost from the receiver terminal.

The buffer 1030 may store data acquired by the transmitter terminal 1000.

The controller 1040 may select some receiver terminals according to a data loss rate of the first data based on the feedback information received from the plurality of receiver terminals. According to an exemplary embodiment, the controller 1040 may select a first receiver terminal having a lowest data loss rate and a second receiver terminal having a highest data loss rate.

The controller 1040 may determine a transmission speed of second data transmitted after the first data, by using at least one selected from feedback information of a selected receiver terminal and variation information of data stored in the buffer 1030 of the transmitter terminal 1000.

According to an exemplary embodiment, the controller 1040 may determine the transmission speed of the second data based on an amount of data transmitted to the plurality of receiver terminals for a preset time and an amount of data stored in the buffer 1030.

According to another exemplary embodiment, the controller 1040 may determine a data loss rate occurring due to a buffer overflow according to a data loss rate of the first receiver terminal having the lowest data loss rate of the first data among the plurality of receiver terminals. The controller 1040 may determine the transmission speed of the second data based on transmission and reception times of the first data and the data loss rate occurring due to the buffer overflow.

Also, the controller 1040 may determine a data loss rate occurring due to a channel error based on a difference between the data loss rate of the first receiver terminal having the lowest data loss rate and a data loss rate of the second receiver terminal having the highest data loss rate among the plurality of receiver terminals. The controller 1040 may determine the number of pieces of parity data including restoration information of the first data based on the data loss rate occurring due to the channel error. The controller 1040 may also determine a transmission interval at which the parity data is transmitted, based on information of a data loss interval included in the feedback information of the second receiver terminal.

Figure 11:
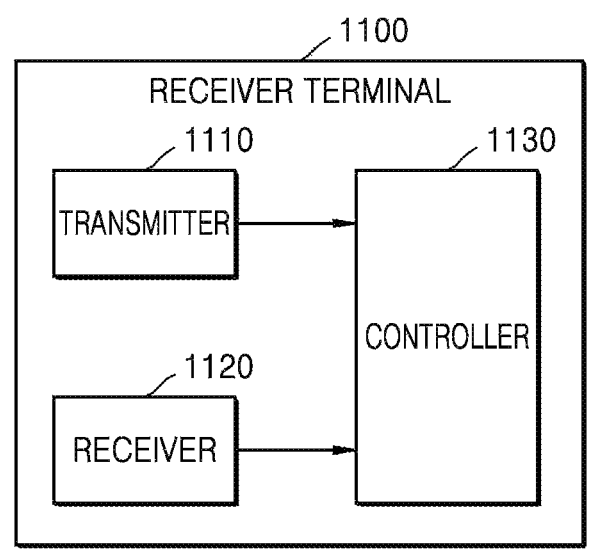
FIG. 11 is a block diagram of a receiver terminal according to an exemplary embodiment.

FIG. 11 is a block diagram of a receiver terminal 1100 according to an exemplary embodiment.

Referring to FIG. 11, the receiver terminal 1100 may include a receiver 1110, a transmitter 1120, and a controller 1130.

The receiver terminal 1100 of FIG. 11 includes elements associated with the present exemplary embodiment. Therefore, the receiver terminal 1100 may further include other common elements besides the elements of FIG. 11.

The receiver 1110 receives first data from the transmitter terminal 1000. The receiver 1110 may also receive second data from the transmitter terminal 1000 according to a transmission speed determined from feedback information of a receiver terminal selected from a plurality of receiver terminals connected to the transmitter terminal 1000 based on a data loss rate of the first data.

According to an exemplary embodiment, the receiver 1110 may receive first parity data determined based on a data loss rate occurring due to a channel error between a plurality of receiver terminals and the transmitter terminal 1000. Here, the first parity data may include restoration information of the first data.

The transmitter 1120 transmits feedback information about the first data to the transmitter terminal 1000. According to an exemplary embodiment, the transmitter 1120 may transmit the feedback information to the transmitter terminal 1000 whenever receiving data from the transmitter terminal 1000. According to another exemplary embodiment, the transmitter 1120 may transmit the feedback information to the transmitter terminal 1000 whenever the controller 1130 senses a loss of data.

The controller 1130 generates the feedback information about the first data. Here, the feedback information may include information about packets included in the first data which have been lost. For example, the controller 1130 may generate feedback information including information about the data loss rate of the first data. According to another exemplary embodiment, the controller 1130 may generate feedback information including information about a time interval at which the packets included in the first data are lost.

An apparatus according to the exemplary embodiments may include a processor, a memory that stores and executes program data, a permanent storage such as a disk drive, a communication port that communicates with an external apparatus, a user interface such as a touch panel, a key pad, buttons, or the like, etc. Methods of embodying a software module or an algorithm may be stored as computer-readable code or program commands executable on the processor, on a computer-readable recording medium. Examples of the computer-readable recording medium include a magnetic storage medium (for example, read-only memory (ROM), random-access memory (RAM), a floppy disc, a hard disk, etc.) and an optical reading medium (for example, CD-ROMs, digital versatile discs (DVDs), etc.). The computer-readable recording medium may also be distributed over network-coupled computer systems so that the computer-readable code is stored and executed in a distributed fashion. The computer-readable recording medium may be read by a computer, stored in a memory, and executed by a processor.

All types of documents, including published documents, patent applications, patents, etc. cited in the exemplary embodiments may be incorporated herein in their entirety by reference.

For understanding the exemplary embodiments, reference numerals are shown in the embodiments illustrated in the drawings, and particular terminologies are used to describe the embodiments. However, the exemplary embodiments are not limited by the particular terminologies, and the exemplary embodiments may include all types of elements that may be considered by those of ordinary skill in the art.

The exemplary embodiments may be embodied as functional block structures and various processing operations. These functional blocks may be embodied via various numbers of hardware and/or software structures that execute particular functions. For example, the exemplary embodiments may use direct circuit structures, such as a memory, processing, logic, a look-up table, etc. that may execute various functions through controls of one or more microprocessors or other control apparatuses. Like elements of the exemplary embodiments may be executed as software programming or software elements, the exemplary embodiments may be embodied as a programming or scripting language such as C, C++, assembly language, or the like, including various algorithms that are realized through combinations of data structures, processes, routines, or other programming structures. Functional sides may be embodied as an algorithm that is executed by one or more processors. Also, the exemplary embodiments may use related arts to perform electronic environment setting, signal processing, and/or data processing, etc. Terminology such as a mechanism, an element, a means, or a structure may be widely used and is not limited as mechanical and physical structures. The terminology may also include meanings of a series of routines of software along with a processor, etc.

The embodiments described in the exemplary embodiments are just exemplary and do not limit the scope of the present invention. For conciseness of the present specification, descriptions of the conventional electronic elements, control systems, software, and other functional sides of the systems have been omitted. Also, connections between lines of elements shown in the drawings or connection members of the lines exemplarily indicate functional connections and/or physical connections or circuit connections. The connections may be replaced or may be indicated as additional various functional connections, physical connections, or circuit connections in a real apparatus. If there is no detailed mention such as "necessary", "important", or the like, the connections may not be elements for making the present invention.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of transmitting and receiving data by a transmitter terminal, the method comprising:
    transmitting first data to a plurality of receiver terminals connected to a transmitter terminal;
    receiving a plurality of feedback information from the plurality of receiver terminals;
    determining first data loss rates based on the plurality of feedback information;
    selecting a maximum data loss rate and a minimum data loss rate among the first data loss rates;
    determining a second data loss rate based on a difference between the maximum data loss rate and the minimum data loss rate;
    determining a transmission speed of second data based on the second data loss rate; and transmitting the second data to the plurality of receiver terminals according to the determined transmission speed.

2. The method of claim 1, wherein the determining of the transmission speed comprises:
determining a transmission speed of the first data based on an amount of data transmitted to at least one of the plurality of receiver terminals for a preset time; and
determining the transmission speed of the second data based on the transmission speed of the first data and an amount of data capable of being stored in a buffer.

3. The method of claim 2, further comprising:
determining, based on a data loss rate of the first data, parity data, wherein the parity data comprises restoration information about the first data.

4. The method of claim 1, wherein the determining of the transmission speed comprises:
determining a cause of the minimum data loss rate is an excess of a buffer capacity.

5. The method of claim 4, wherein the determining of the transmission speed comprises determining the transmission speed of the second data based on a round trip time (RTT) between the transmitter terminal and a first receiver terminal among the plurality of receiver terminals and the data loss rate caused by the excess of the buffer capacity.

6. The method of claim 1, further comprising:
selecting, from the plurality of receiver terminals, a first receiver terminal having the minimum data loss rate of the first data and a second receiver terminal having the maximum data loss rate of the first data; and
determining a data loss rate caused by a channel error according to a difference between the data loss rate of the first receiver terminal and the data loss rate of the second receiver terminal.

7. The method of claim 6, further comprising:
determining, based on the determined data loss rate caused by the channel error, parity data, wherein the parity data comprises restoration information of the first data.

8. A method of transmitting and receiving data, by a receiver terminal, the method comprising:
receiving first data from a transmitter terminal through one of a plurality of receiver terminals connected to the transmitter terminal;
transmitting feedback information about the first data to the transmitter terminal; and
receiving second data from the transmitter terminal according to a transmission speed determined based on a difference between a maximum data loss rate and a minimum data loss rate among first data loss rates acquired from a plurality of feedback information transmitted from the plurality of receiver terminals to the transmitter terminal.

9. The method of claim 8, wherein if a data loss rate of at least one receiver terminal among the plurality of receiver terminals is the minimum data loss rate, the transmission speed is determined based on the data loss rate of the receiver terminal and a round trip time (RTT) between the transmitter terminal and the receiver terminal.

10. The method of claim 9, further comprising:
receiving first parity data that comprises restoration information of the first data and is determined based on a data loss rate caused by a channel error between the plurality of receiver terminals and the transmitter terminal,
wherein the data loss rate caused by the channel error is determined according to a difference between the data loss rate of the at least one receiver terminal and a data loss rate of another receiver terminal having the maximum data loss rate of the first data among the plurality of receiver terminals.

11. A transmitter terminal comprising:
a communicator;
a receiver configured to receive feedback information from a plurality of receiver terminals;
a buffer; and
at least one processor configured to control the buffer to store first data, to control the communicator to transmit the first data to the plurality of receiver terminals, to receive a plurality of feedback information from the plurality of receiver terminals, to determine first data loss rates based on the plurality of feedback information, to select a maximum data loss rate and a minimum data loss rate among the first data loss rates, to determine a second data loss rate based on a difference between the maximum data loss rate and the minimum data loss rate, to determine a transmission speed of second data based on the second data loss rate and to control the communicator
to transmit the second data to the plurality of receiver terminals according to the determined transmission speed.

12. The transmitter terminal of claim 11, wherein the at least one processor is further configured to determine a transmission speed of the first data based on an amount of data transmitted to at least one of the plurality of receiver terminals for a preset time and determine the transmission speed of the second data based on the transmission speed of the first data and an amount of data capable of being stored in the buffer.

13. The transmitter terminal of claim 12, wherein the at least one processor is further configured to determine parity data, wherein the parity data comprises restoration information about the first data based on a data loss rate of the first data.

14. The transmitter terminal of claim 11, wherein the at least one processor is further configured to determine a cause of the minimum data loss rate is an excess of a buffer capacity.

15. The transmitter terminal of claim 14, wherein the at least one processor is further configured to determine the transmission speed of the second data based on a round trip time (RTT) between the transmitter terminal and a first receiver terminal among the plurality of receiver terminals and the data loss rate occurring due to the excess of the buffer capacity.

16. The transmitter terminal of claim 11, wherein the at least one processor is further configured to select a first receiver terminal having the minimum data loss rate of the first data and a second receiver terminal having the maximum data loss rate of the first data from the plurality of receiver terminals and determine a data loss rate caused by a channel error according to a difference between a data loss rate of the first receiver terminal and a data loss rate of the second receiver terminal.

17. The transmitter terminal of claim 16, wherein the at least one processor is further configured to determine parity data comprising restoration information of the first data based on the determined data loss rate caused by the channel error.

18. A receiver terminal comprising:
a communicator;
a buffer configured to receive first data from a transmitter terminal;

at least one processor configured to control the buffer to store the received first data, to generate feedback information about the first data, to control the communicator to transmit the feedback information about the first data to the transmitter terminal and to receive second data from the transmitter terminal according to a transmission speed determined based on a difference between a maximum data loss rate and a minimum data loss rate among first data loss rates acquired from a plurality of feedback information transmitted from a plurality of receiver terminals to the transmitter terminal.

19. The receiver terminal of claim 18, wherein if a data loss rate of the receiver terminal is the minimum data loss rate among the plurality of receiver terminals, the transmission speed is determined based on the data loss rate of the receiver terminal and a round trip time (RTT) between the receiver terminal and the transmitter terminal.

20. The receiver terminal of claim 19, wherein the at least one processor is further configured to control the communicator to receive first parity data that comprises restoration information of the first data and is determined based on a data loss rate occurring due to a channel error between the plurality of receiver terminals and the transmitter terminal,
wherein the data loss rate caused by the channel error is determined according to a difference between the data loss rate of the receiver terminal and a data loss rate of a receiver terminal having a highest data loss rate of the first data among the plurality of receiver terminals.

21. A non-transitory computer-readable recording medium having recorded thereon a program for executing the method of claim 1 on a computer.

\* \* \* \* \*